(No Model.) 3 Sheets—Sheet 1.

P. D. HARTON.
TRIPLET CAKE MAKING MACHINE.

No. 571,921. Patented Nov. 24, 1896.

Witnesses:
J. P. Appleman
M. H. Miles

Inventor.
Pembroke D. Harton.
By J. B. McGirr.
Attorney (No Model.) 3 Sheets—Sheet 2.

P. D. HARTON.
TRIPLET CAKE MAKING MACHINE.

No. 571,921. Patented Nov. 24, 1896.

Witnesses:
J. P. Appleman.
M. H. Miles.

Inventor:
Pembroke D. Harton.
By J. B. McGirr,
Attorney.

(No Model.)  3 Sheets—Sheet 3.
P. D. HARTON.
TRIPLET CAKE MAKING MACHINE.
No. 571,921. Patented Nov. 24, 1896.
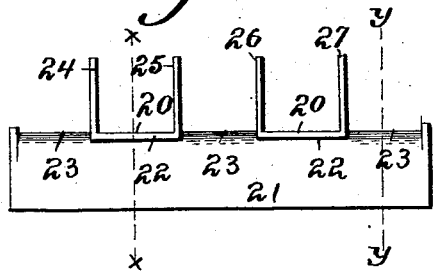
Fig. 5.
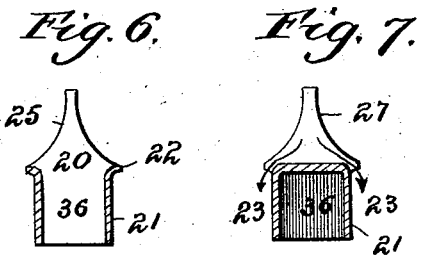
Fig. 6.   Fig. 7.
Fig. 8.
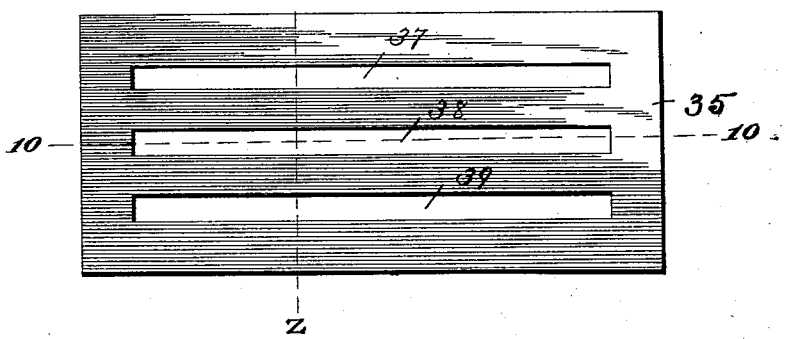
Fig. 9.
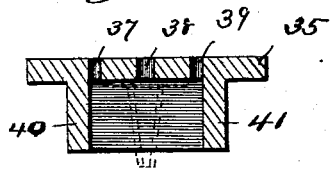
Fig. 10.
Fig. 11.
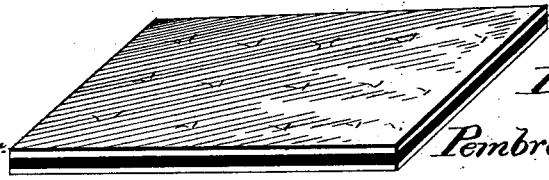
Witnesses:
J. P. Appleman
M. H. Miles
Inventor:
Pembroke D. Harton
By J. B. McGirr,
Attorney
THE NORRIS PETERS CO., PHOTO-LITHO., WASHINGTON, D. C.

UNITED STATES PATENT OFFICE.

PEMBROKE D. HARTON, OF PHILADELPHIA, PENNSYLVANIA.

TRIPLET-CAKE-MAKING MACHINE.

SPECIFICATION forming part of Letters Patent No. 571,921, dated November 24, 1896.

Application filed June 23, 1896. Serial No. 596,617. (No model.)

*To all whom it may concern:*

Be it known that I, PEMBROKE D. HARTON, a citizen of the United States, residing at Philadelphia, in the county of Philadelphia and State of Pennsylvania, have invented certain new and useful Improvements in Triplet-Cake-Making Machines; and I do declare the following to be a full, clear, and exact description of the invention, such as will enable others skilled in the art to which it appertains to make and use the same, reference being had to the accompanying drawings, and to the figures of reference marked thereon, which form a part of this specification.

The invention relates to certain improvements in cake and cracker machines.

An object of the invention is to provide an improved machine for producing a continuous ribbon composed of alternating layers of different materials, such as dough and jelly or jam, and wherein the different materials are forced into an improved arrangement of separate chambers and from thence through an improved arrangement of concentric nozzles to form the sheet or ribbon of alternating layers ready for the oven.

Another object of the invention is to provide certain improvements in detail of construction and in arrangement of parts whereby a highly efficient and advantageous cake or cracker machine for producing sheets of alternating materials is produced.

The invention consists in certain novel features of construction and in combination and arrangements of parts, as more fully described and pointed out hereinafter.

Figure 1:
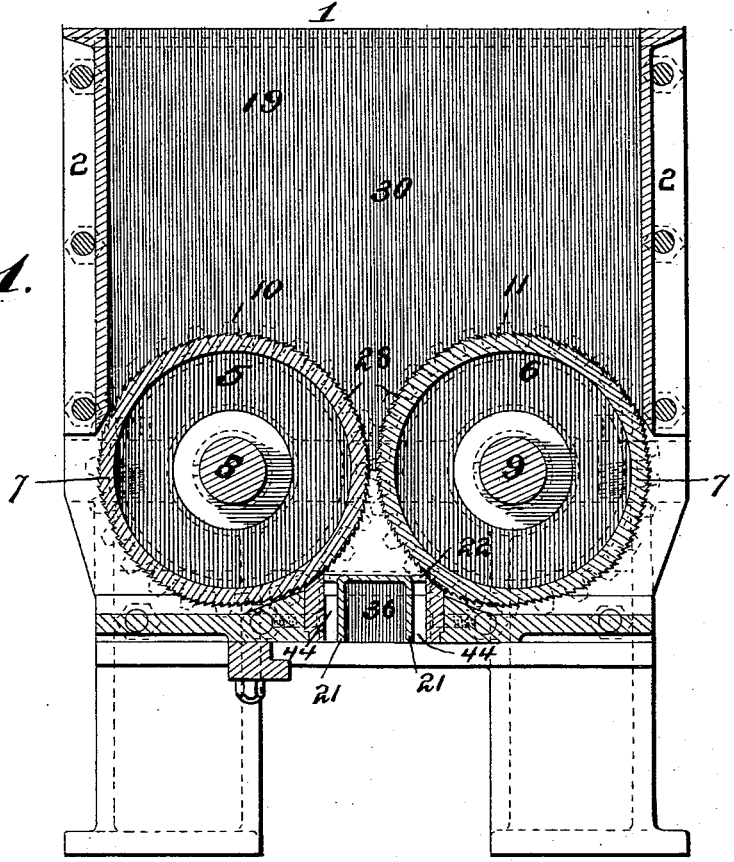
Figure 3:
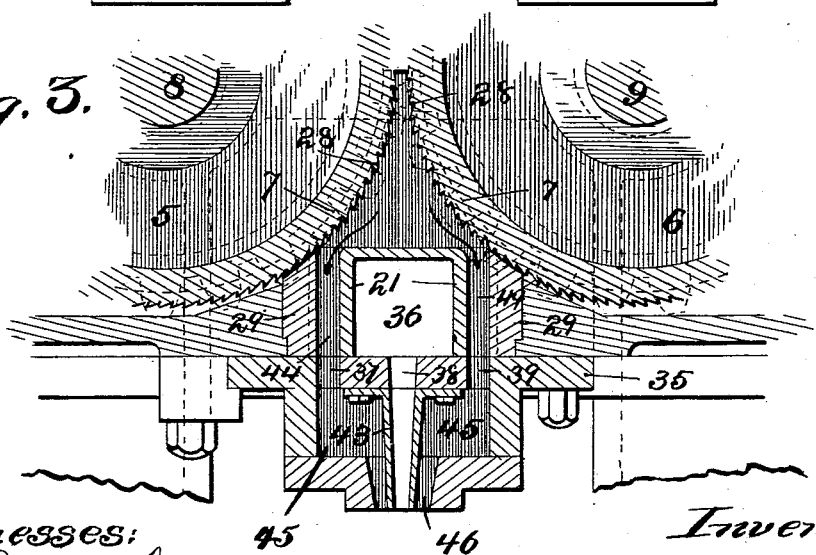
Figure 2:
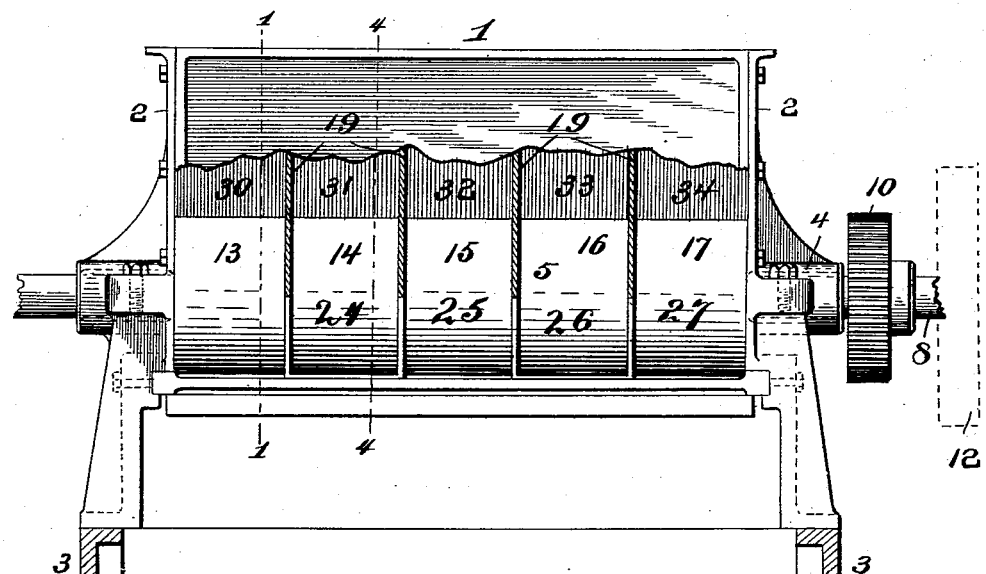
Figure 4:
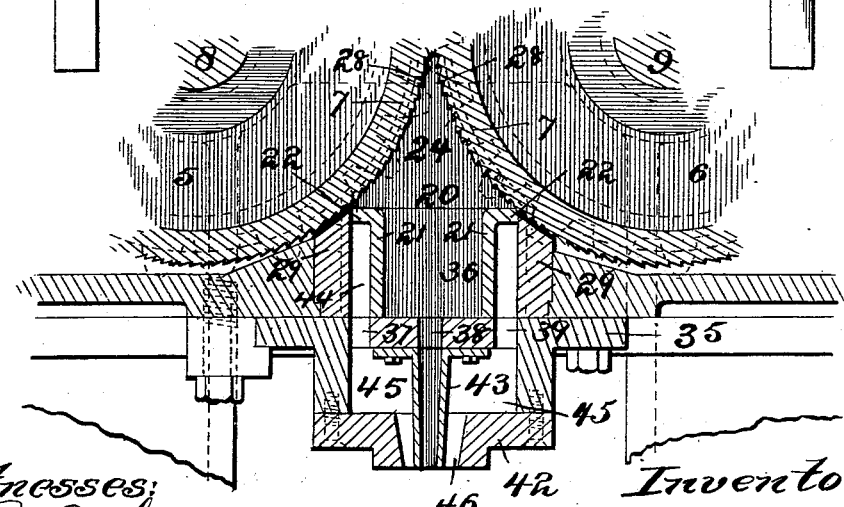

Referring to the accompanying drawings, Figure 1 is a cross-section of the machine, taken on the lines 1 1 of Fig. 2, the lower nozzles not being shown. Fig. 2 is a side elevation, partially in section, the lower nozzles being removed. Fig. 3 is a cross-sectional view taken on the same plane as Fig. 1 with the bottom frame carrying the nozzles shown in proper place. Fig. 4 is a cross-section taken on the line 4 4 of Fig. 2 with the parts in the same position as shown in Fig. 3. Fig. 5 is a detail elevation of the removable box or casing forming one of the chambers, the jelly-chamber terminating in a nozzle. Figs. 6 and 7 are cross-sections on the lines $x$ $x$ and $y$ $y$, respectively, of Fig. 5. Fig. 8 is a plan view of the supporting-plate for the chambers and nozzles and through which the different masses of materials to form the different layers of the complete sheet are passed. Fig. 9 is a cross-sectional view taken on the line $z$ $z$ of Fig. 8. Fig. 10 is a longitudinal section thereof on the line 10 10 of Fig. 8. Fig. 11 is a detail perspective of a cracker or cake formed or cut from the sheet made by such machine as shown.

The framework in this machine is generally similar to that shown in my Patent No. 516,648, dated March 20, 1894.

In the drawings, 1 is the hopper of the machine, having its vertical or upright sides 2 suitably fastened to the bed of the machine, which is shown mounted on uprights. Two parallel shafts 8 and 9 extend longitudinally through the lower portion of the hopper, and at their ends are mounted in bearings 4 at the exterior of the hopper. These shafts are united to rotate in opposite directions by the gears 10 11, and one of the shafts has a drive-pulley 12. The hopper is divided into a number of separate compartments for each kind of material to be forced into the sheet, or there are several compartments for the material which is to form each layer of the sheet fed from the machine. As specifically shown in the drawings, the hopper is divided into five separate vertical compartments 30, 31, 32, 33, and 34 by the vertical partition-plates 19, each snugly fitting in and located transversely of the hopper to shut off one compartment from the other.

Feed-rollers 5 and 6 are rigidly secured on the shafts 8 and 9, and these rolls have the circumferential grooves 7 to receive said partitions 19 and to divide the rolls into the divisions 13, 14, 15, 16, and 17, arranged and rotating in the respective compartments 30, 31, 32, 33, and 34 of the hopper. The rolls are corrugated or serrated, as shown at 28, so that the surfaces of the two rolls in each compartment coöperate in forcing and feeding the materials downwardly.

The bed of the machine beneath each roll is provided with strippers 29 29 to strip the material from the surface of the rollers. In the space between the strippers and beneath the meeting edge of the rolls and at the ends secured to the machine-frame is arranged an elongated box or chamber 21, longitudinally beneath the entire length of the hopper and all the compartments thereof. The general width of the box is such as to have the vertical strippers 29 29 on each side thereof. This box is provided with the vertical partitions 24, 25, 26, and 27, extending upwardly from the top of the box and entering the grooves 7 of the rolls and forming downward continuations of the partitions 19 of the hopper, so that the compartments of the hopper are continued down between the rolls and below the bite thereof.

Beneath every alternate compartment of the hopper the box is closed and rounded at the top, (see Figs. 3 and 7,) so that the box forms a dividing or deflecting obstruction, and the separate streams of material forced from compartments 30, 32, and 34 of the hopper are divided by said box or chamber and forced down into the spaces 44 44, extending the full length of the box, and wherein the separate streams are united into two flat streams. Beneath the intervening compartments 31 and 33 of the hopper said box or chamber has top openings 20 20, with outturned edges 22 22, which close the spaces 44 44 at said openings 20 and between the partitions 24, 25, 26, and 27, so that the two streams of material from the compartments 31 and 33 are passed solidly and directly into the long interior of said box or chamber and there united into one body between and separated from the two separated bodies of material in spaces 44 44 on each side of the box or chamber.

A nozzle or supporting die-plate 35 is removably secured to the machine-bed longitudinally beneath the passages 44 44 and the said chamber 21, inclosing the chamber 21 except for the narrow discharge opening or slit 38, extending the full length of the chamber, and this plate also has the narrow long discharge-openings 37 and 39, registering with the lower ends of the passages 44 44 and the depending inclosing walls 40 41 and closed at the bottom by a plate 42, having a central downwardly-tapered nozzle 46, formed longitudinally of the full length of the walls 40 41.

43 is a nozzle secured to and depending from the plate 35 and registering with the discharge-slit 38 from the chamber 21 and extending centrally between the walls 40 41, centrally into the nozzle 46, and centrally dividing said nozzle 46 into two like openings on each side of the nozzle 43, and centrally dividing the interior of the space between the walls 40 41 into two like spaces 45 45, communicating, respectively, with the spaces 44 44 and with the discharge-openings on opposite sides of the dividing-nozzle 43. It should be noted that three nozzles or discharge-slits thus formed by the connecting-nozzles 43 46 end in the same plane and that the material will be discharged therefrom in three layers, which practically form one sheet when discharged onto the belt or conveyer.

In practical operation dough is usually placed in the hopper-compartments 30, 32, and 34, and jam or jelly or other preserves in the compartments 31 and 33, and the dough is forced by the corrugated rolls into the passages 44 44, and the two masses or sheets formed by the box or chamber 21 are forced by said corrugated rolls through passages 44 44 and spaces 45 45 in two sheets through nozzle 46. The preserve is forced in several streams into the chamber 21, where it forms one mass, which is forced directly through nozzle 43, forming a sheet or layer between the two sheets of dough.

I do not wish to limit myself to the particular number of hopper-compartments shown, but advantages are attained by thus dividing up the masses of the dough and preserves to be acted on, particularly where the feed-rolls constitute the entire propelling means for forcing the several streams of material through the machine.

It should be noted that the parts are simple in construction and can be easily removed to be cleaned, &c., and that the machine shown is adapted for producing a sheet of three layers of various substances, and that by duplicating the apparatus a sheet of more than three layers can be produced.

It is evident that various changes can be made in the forms of construction and arrangements of the parts described without departing from the spirit and scope of my invention.

What I claim is—

1. In a cake-machine, the combination of the hopper, a pair of coöperating feed-rollers arranged in the bottom thereof, transverse partitions dividing said hopper into a plurality of separate compartments, separate discharge-passages from the compartments and beneath the rolls, two chambers in which more than two of said passages open, another chamber between said first-mentioned chamber into which the remaining several passages open, and concentric nozzles from said three chambers forming a sheet of three layers of the materials forced through the chambers, &c., by the rolls, all substantially as and for the purposes set forth.

2. In a cake-machine, the combination of a hopper, two coöperating feed-rolls therein having series of circumferential grooves, a series of transverse partitions entering said grooves and dividing the hopper into a series of entirely separate compartments, separate discharge-passages beneath the rolls and from the compartments, and chambers into which certain passages open, said chambers having nozzles, all substantially as set forth.

3. In a cake-making machine, the combination of feeding means for forcing several streams of materials, an elongated chamber arranged beneath the feeding means with down-passages on both sides thereof, an opening in the top of the chamber with said passages closed at said opening, the bottom of the chamber having a narrow opening, a nozzle depending from said opening, a casing into which the said passages open having a bottom nozzle, said chamber-nozzle passing centrally through said casing and dividing the same into two spaces and entering said casing-nozzle and dividing the same into two nozzles, substantially as and for the purposes set forth.

4. In a cake-machine, the combination of a hopper divided into a series of compartments, and each having its own bottom discharge-passage, a series of chambers less in number than the compartments and passages, each chamber having a sheet-forming nozzle, said nozzles concentrically arranged to form a sheet of layers of materials, certain passages opening into and concentrating the material therefrom in one chamber, and the remaining passages opening into and concentrating their material in the remaining chamber, and means for forcing the soft materials from the compartments, and through the passages, chambers and nozzles, substantially as and for the purposes set forth.

5. In a cake-machine, the combination of an elongated hopper, a pair of parallel biting feed-rolls arranged in and throughout the length thereof, transverse partitions in the hopper fitting the rolls and dividing the hopper into a series of compartments arranged side by side with the rolls in each, each compartment having a separate down-discharge passage between the rolls, and discharge-nozzles with which said passages communicate, substantially as and for the purposes set forth.

6. In combination, a hopper, a pair of coacting feed-rolls therein having roughened surfaces, transverse partitions in the hopper snugly fitting the rolls and forming separate compartments with the rolls in the bottoms of each, partitions between the rolls and below the bite thereof forming separate down-discharge passages from said compartments, and nozzles communicating with said passages, substantially as and for the purposes set forth.

7. In combination, a hopper-frame, a hopper having a series of compartments provided with feeding means, each compartment having a separate down-discharge passage, said passages arranged side by side, an elongated box or chamber arranged beneath all of said passages and having a discharge-nozzle, two passage-spaces on opposite sides of said chamber, respectively, nozzles with which said spaces respectively communicate, said chamber having top openings into certain discharge-passages which are closed from said spaces, the chamber being closed at the top beneath the remaining discharge-passages so that the material passing down said passages is divided by the top of the chamber and passed into said two side passage-spaces, substantially as and for the purposes set forth.

8. In combination, a frame, a hopper divided into several compartments, a pair of coacting feed-rolls passing through all the compartments, a chamber arranged longitudinally beneath the bite of the rolls, vertical partitions extending up from the chamber between the rolls and below the bite thereof and forming separate down-discharge passages from the compartments, the vertical roll-strippers arranged on each side of said chamber and forming the down-passage spaces between themselves and the side of the chamber, said chamber having top openings between certain partitions with edges extending to the strippers and closing said spaces beside said openings so that the material from said passages passes into the chamber, beneath the remaining passages the top of the chamber formed to divide the downflowing material and pass it into said two spaces, a horizontal plate having a narrow discharge-opening at the bottom of the chamber and corresponding openings from the spaces and a central depending casing around all of said openings, a plate secured to the bottom of said casing having a central nozzle, and a nozzle from said chamber-opening depending through the casing and centrally arranged in said first-mentioned nozzle, all substantially as and for the purposes set forth.

In testimony whereof I affix my signature in presence of two witnesses.

PEMBROKE D. HARTON.

Witnesses:
FRED JOHNSON,
WILLIAM H. PRICE.